United States Patent [19]

Miller

[11] 4,310,913

[45] Jan. 12, 1982

[54] STYLUS TRACKING AID USING TWO BIMORPH ELEMENTS LONGITUDINALLY ALIGNED

[75] Inventor: Michael E. Miller, Indianapolis, Ind.

[73] Assignee: RCA Corporation, New York, N.Y.

[21] Appl. No.: 61,069

[22] Filed: Jul. 26, 1979

[51] Int. Cl.[3] .......................... G11B 7/00; G11B 9/00; G11B 3/00

[52] U.S. Cl. .................................... 369/43; 369/126; 369/144; 310/331

[58] Field of Search ................. 179/100.1 G, 100.4 R, 179/100.4 D; 358/128.5; 360/77, 75, 103, DIG. 1; 369/43, 126, 144, 145; 310/331

[56] References Cited

U.S. PATENT DOCUMENTS

| | | | |
|---|---|---|---|
| 2,478,223 | 8/1949 | Argabrite | 171/327 |
| 2,858,373 | 10/1958 | Hollmann | 369/144 |
| 3,183,516 | 5/1965 | Sliter | 360/103 X |
| 3,433,904 | 3/1969 | Kowalik | 369/145 X |
| 3,471,655 | 10/1969 | Herve | 179/100.4 D |
| 3,787,616 | 1/1974 | Falk et al. | 178/6.6 A |
| 3,842,194 | 10/1974 | Clemens | 358/128.5 |
| 3,963,861 | 6/1976 | Crooks | 178/6.6 R |
| 3,993,863 | 11/1976 | Leedom et al. | 178/6.6 DD |
| 4,080,625 | 3/1978 | Kawamoto | 358/128 |
| 4,099,211 | 7/1978 | Hathaway | 360/77 X |
| 4,162,511 | 7/1979 | Toda et al. | 179/100.1 G |
| 4,164,756 | 8/1979 | Toda et al. | 360/DIG. 1 X |
| 4,172,265 | 10/1979 | Sakamoto et al. | 360/DIG. 1 X |

OTHER PUBLICATIONS

*Proceedings of the IEEE*, vol. 53 No. 10, Oct. 65, Jaffe & Berlincourt "Piezoelectric Transducer Materials".
*Proceedings of the IRE*, vol. 46 Apr. 58: "IRE Standards on Piezoelectric Crystals: Determination of Elastic, Piezoelectric & Dielectric Constants . . ."

*Primary Examiner*—Aristotelis M. Psitos
*Attorney, Agent, or Firm*—E. M. Whitacre; J. S. Tripoli; E. P. Herrmann

[57] ABSTRACT

A stylus assembly for use with a high density information record such as a grooved video disc. The stylus arm includes a first transducer for detecting lateral forces applied by the record groove to the pickup stylus, and a second transducer responsive to signal generated by the first transducer to translocate the stylus and thereby reduce said forces. The adaptive elimination of lateral forces to the stylus reduces stylus and disc wear and reduces the probability of record imperfections causing the stylus to radially skip over grooves.

2 Claims, 5 Drawing Figures

U.S. Patent    Jan. 12, 1982    4,310,913
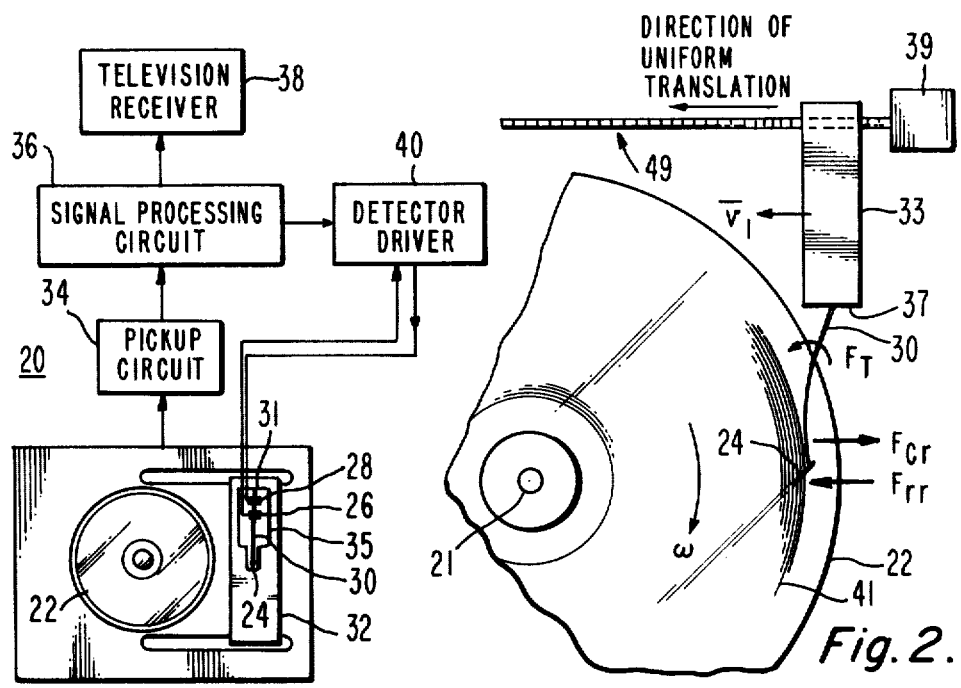
Fig.1.
Fig.2.
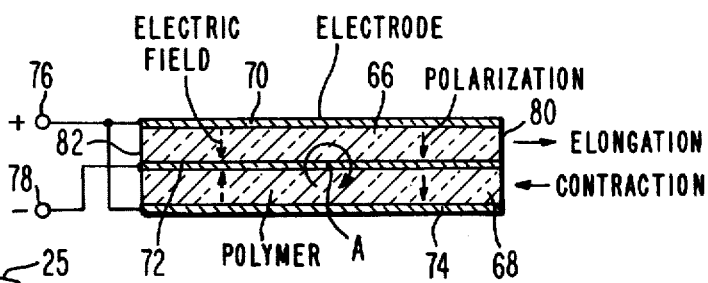
Fig.5.
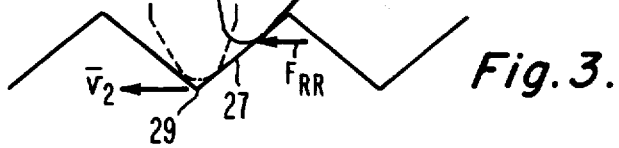
Fig.3.
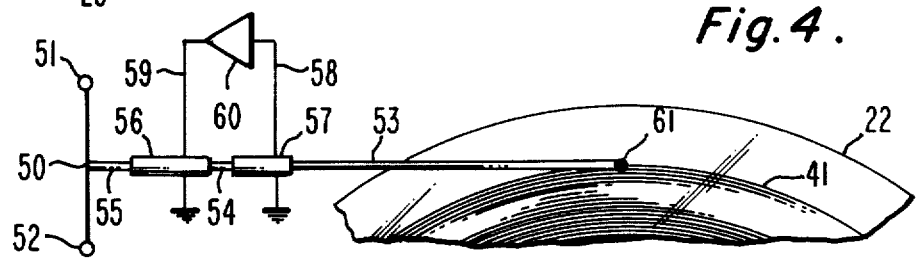
Fig.4.

STYLUS TRACKING AID USING TWO BIMORPH ELEMENTS LONGITUDINALLY ALIGNED

The present invention relates in general to a recorded disc playback system, and more particularly it relates to an apparatus for reducing the occurrence of translatory motion of a pickup stylus due to imperfections in the recording media.

In high density recording systems, as for example certain types of video disc systems, video information is recorded by means of geometric variations in the bottom of a smooth spiral groove on the surface of a disc record. The record surface may include a coating of conductive material which is preferably covered with a thin deposit of dielectric material or, the record may comprise a conductive material dispersed in a dielectric material. A pickup stylus, supported at one end of a stylus arm, engages the spiral groove and includes a conductive electrode which establishes a capacitance with the conductive coating and the dielectric deposit or dielectric layer of the record. When the record is rotated, the stylus/record capacitance varies in response to the geometric variations in the bottom of the spiral groove. The capacitance variations are converted to electrical signal variations by suitable signal processing circuitry coupled to the stylus electrode. The output signal of the signal processing circuitry may be coupled to a conventional television receiver for reproduction. The other end of the stylus arm is releasably secured to a stylus arm carriage of the playback system. A system of the aforementioned type is described in detail in U.S. Pat. No. 3,842,194, issued to J. K. Clemens, and entitled, "INFORMATION RECORDS AND RECORDING/PLAYBACK SYSTEMS THEREFOR".

Typically, the pitch between the spiral grooves in such systems is extremely small, on the order of a few microns. As a practical result, the groove depth is relatively shallow, too shallow to reliably provide sufficient radial forces to impart transitory motion of the pickup stylus across the record. Therefore, a drive mechanism is arranged to translate the stylus radially at a uniform rate synchronized with rotation of the record, which uniform rate is chosen to maintain the stylus in the center of the groove. However, if the apparent spiral grooves are not substantially circular due to warpage of the record, or misalignment of the grooves with the center of the record, etc., the stylus will move off-center to the sides of groove and be subjected to radial forces. If, in the presence of such radial forces, the stylus encounters a defect in the record sufficient to raise it above the groove wall, the stylus may be thrown several grooves ahead or behind the groove in which it was tracking, producing undesirable effects in the displayed signal.

The present invention reduces the probability of undesirable radial motion of the stylus resulting from the stylus tracking the spiral groove in an off-center position—by (1) including a first bimorph in the member upon which the stylus is mounted for detecting changes in the radial forces on the stylus and (2) incorporating a second bimorph in tandem with the first to impart lateral motion to the stylus in response to the signal produced by the first bimorph, to relieve the radial force imparted by the groove wall. With the radial forces removed from the stylus, the probability of the stylus returning to the same groove from which it was ejected (or one in close proximity) by a physical defect are greatly improved.

In the Drawings:

FIG. 1 is a diagram, partly in block form, illustrating a disc playback system incorporating an adaptive-stylus arm in accordance with the instant invention;

FIG. 2 is a diagram of a stylus-record interaction showing the forces developed on the stylus arm;

FIG. 3 is a graphical representation of stylus-groove relationships which may be encountered during playback;

FIG. 4 is a diagram of a stylus arm embodying the present invention; and

FIG. 5 is a cross-sectional view of a typical bimorph.

A bimorph, as used herein, is a sandwich structure of two or more piezoelectric plates cemented together in such a way that a voltage applied across the sandwich causes the adjacent piezoelectric plates to alternately expand and contract so that the structure bends in proportion to the applied voltage. It is presumed that the structure is longer than it is wide. The dimension parallel with the longer side is designated the longitudinal dimension. The bending of the bimorph imparts a relative motion between the longitudinal extremities of the structure. Conversely, an applied pressure or moment generates a potential across the composite structure.

Referring to FIG. 1, a video disc system 20 has a turntable assembly for rotatably supporting the disc record 22 having information tracks thereon containing composite picture and sound components of a video signal. The recorded information occurs as geometric variations formed in the information tracks or groove on the surface of the disc record. The disc or at least a layer of the disc proximate the surface is conductive. A signal pickup stylus 24 having a conductive electrode thereon engages the information track so that a capacitance is formed between the electrode and the conductive disc record. When relative motion between the disc record and the stylus is established by rotating the disc at a predetermined speed (e.g., 450 rpm) a temporally varying capacitance is produced in accordance with the geometric variations in the track.

The stylus electrode is coupled to a pickup circuit 34 which translates the stylus/disc capacitance variations into electrical signal variations. An example of the pickup circuit 34 can be found in the U.S. Pat. No. 4,080,625 issued Mar. 21, 1978 to H. Kawamoto et al., and entitled, "PICKUP CIRCUITRY FOR A VIDEO DISC PLAYER WITH PRINTED CIRCUIT BOARD".

The player includes a signal pickup cartridge 35 removably mounted in a carriage assembly 32 which is subject to radial translation across the disc record in correlation with the rotation of the turntable. The signal pickup stylus 24 is mounted within the cartridge and arranged for engagement with the disc record. Stylus 24 is secured to the free end of a composite stylus arm comprising a longitudinal supporting element 30 and first and second bimorph elements 26 and 28 for sensing and imparting translational movement to the stylus under control of detector/driver circuitry 40. The composite stylus arm is mounted to the cartridge structure and arranged to permit relatively free pivotal motion of the stylus arm normal to the disc record.

The output of the pickup circuit 34 is applied to a signal processing circuit 36 for transforming the input thereto into an output composite signal in the NTSC format for application to a conventional television receiver 38.

Referring now to FIG. 2, stylus 24 rigidly attached at the free end of stylus arm 30 tracks the grooves formed in record disc 22. Stylus arm 30 is fixedly attached to mounting member 37 which allows relatively free motion of the stylus arm in the vertical direction, but is relatively resistant to lateral movement of the stylus arm. The lateral resistance is incorporated to prevent the stylus from being susceptible to unpredictable or ballistic free flight when the stylus is vertically ejected from the disc groove by a physical defect. Mounting member 37 is attached to stylus carrier 33 which may be a cartridge-carriage assembly or simply a carriage assembly for supporting and translating the stylus radially across the disc. Carrier 33 moves at uniform velocity $v_1$, imparted by drive motor 39 and screw 49 for example, in a manner such that a non-deflected stylus will translate radially across the disc. The record 22 having spiral groove 41 thereon rotates at a uniform angular velocity $\omega$ about center point 21, which rotation imparts a radial velocity $v_2$ to the centerline of the groove viewed at a particular radial line. Ideally, the velocity $v_1$ equals the velocity $v_2$ in order for the stylus to maintain a position in the center of the groove to perform optimally as a transducer.

Eccentricity of the spiral groove due to improper centering of the center hole of the disc as well as other problems will cause velocity $v_2$ to vary in amplitude with respect to the angular position of the disc. It is easily seen that a difference in the carriage velocity $v_1$ and apparent radial groove velocity $v_2$ will create both bending and tortional moments in the stylus arm 30, for as long as the stylus is held in the groove. For example, if the velocity $v_2$ exceeds $v_1$, the centerline of the groove will move inwardly along a radial line faster than the carriage, resulting in the stylus being accelerated ahead of the carriage by a lateral force designated $F_{RR}$ imparted to the stylus by the groove wall 27 (see FIG. 3). The relative rigidity of the stylus arm will oppose this force with an equal outward force $F_{CR}$, resulting in a compliant bending of the arm shown exaggerated in FIG. 2. Since the stylus is typically mounted to the stylus arm at a point above the point which tracks the groove, the opposing forces $F_{RR}$ and $F_{CR}$ impart a twist to the stylus arm, tending to position the stylus in such manner to reduce force $F_{RR}$ and resulting in the stylus slipping along the groove wall. For the most part, the difference between velocities $v_1$ and $v_2$ is not sufficient to cause the stylus to escape the groove. However, if the stylus encounters a bump or some other defect in the record groove which applies a vertical force to it, the force developed in the stylus arm may overcome the friction holding the stylus to the groove and loft the stylus outwardly to a point at which the stylus arm is instantaneously under little or no stress. Such an occurrence creates an undesirable effect in the played back signal. In like fashion if $v_1$ exceeds $v_2$, the stylus could skip inwardly upon encountering a defect.

The stylus arm illustrated in FIG. 4 incorporates means to eliminate the lateral forces between the stylus and the groove. With little or no lateral forces acting, if the stylus is momentarily bumped vertically out of the groove by a disc defect, it would then tend to drop vertically downward into the same groove or a nearby groove. Ideally it is desired to have the stylus drop back into the same groove or convolution. The performance of the system would not be appreciably degraded if the stylus fell back to a nearby convolution because of the high repetition of information in this type of record.

In FIG. 4, stylus 61 tracking the groove 41 on record 22 is attached to the free end of stylus arm 53. A bimorph 57 of the type which generates a voltage change in response to a bending of its longitudinal dimension is fixedly incorporated as an integral part of the stylus arm such that a bending moment in the stylus arm is imparted to the bimorph 57 to generate a voltage proportional thereto. The bimorph 57 may be a tandem portion of the stylus arm fixedly connected thereto and longitudinally aligned therebetween such that the bending moment is generated in it directly or it may be laterally attached along one or both of the sides of the stylus arm. The signal generated in bimorph 57 is conducted via leads 58 to electrical circuitry 60. Circuitry 60, responsive to the signal generated by bimorph 57, produces a control signal which is applied to a second bimorph 56. Bimorph 56 is longitudinally aligned and fixedly connected in tandem with the free end of the stylus arm 53. Responsive to the control signal from circuitry 60, bimorph 56 is arranged to impart lateral movement to the free end of the stylus arm in such direction to relieve the bending moment generated therein.

Circuitry 60 is typically a simple voltage amplifier. As is well known to those skilled in the art of piezoelectric transducers, when used as a deflection sensor, the piezoelectric transducer (bimorph) will generate an output signal voltage. Similarly, to induce a deflection in such a transducer it must be energized by an input signal voltage. Since neither the bimorph 56 nor 57 is 100 percent efficient, some signal amplification from sensor 57 to deflector 56 is required.

The members designated 54 and 55 are respective means longitudinally coupling the bimorph 57 to bimorph 56 and coupling bimorph 56 to compliant member 50. To produce maximum lateral motion at stylus 61 per unit of applied voltage to bimorph 56, bimorph 56 should be fixed as near as possible to the fixed end of the composite stylus arm, i.e., connected directly to member 50. In this instance, coupling 55 may be simply an epoxy film. The coupling 54 may include a member similar to the free end of the stylus arm 53, or it may be simply an interface such as epoxy between the two bimorphs. In either case, coupling 54 should electrically insulate bimorph 56 from 57.

Compliant member 50 attached to rigid supports 51 and 52 allows relatively free vertical pivotal movement of the free end of the stylus arm but is relatively resistant to lateral pivotal movement. Freedom of movement in the vertical direction permits the stylus to reliably track a warped disc. The lateral resistance in member 50 affords the necessary support to bimorph 56 so that it can impart lateral motion to the free end responsive to applied voltage.

FIG. 5 shows one configuration of a multi-layer, polymer bimorph transducer suitable for use in the present correction system. In FIG. 5, the numerals 66 and 68 denote polymer films (polyvinylidene fluoride, for example) and numerals 70, 72 and 74 represent electrodes. The outside electrodes 70 and 74 are connected to a terminal 76 and the middle electrode 72 is coupled to a terminal 78. The compensation voltage is applied to the terminals 76 and 78. When the applied electric field (shown by dotted arrows) is in the same direction as the direction of polarization (shown by solid arrow), the polymer film extends. The polymer film shrinks when the applied electric field is in the opposite direction to the direction of the polarization. Illustratively, with the electric field polarity shown in FIG. 5, the end 80 of the FIG. 5 structure would bend downward if the opposite end 82 thereof were fixedly secured (due to elongation of the film 66 and the contraction of the film 68). If the polarity is reversed, the end 80 of the bimorph structure would bend upward.

Alternatively, with terminals 76 and 78 open circuited, and a clockwise bending moment applied about an axis "A" in the bimorph, a potential proportional to the moment will be generated between terminals 76 and 78 having the polarity shown.

Reference may be made to "IRE Standards on Piezoelectric Crystals", Proceedings of the I.R.E., Vol. 46, Apr. 58, pp. 764–778; and "Piezoelectric Transducer Materials", H. Jaffe et al., Proceedings of IEEE, Vol. 53, No. 10, Oct. 65, pp. 1372–1386 for a more comprehensive description of material parameters employed in bimorphs.

While the invention has been described in terms of particular embodiments, variants of the claimed subject matter can be envisioned without straying from the spirit of the invention and the claims should be construed in this light. For example, the tandem bimorph arrangement as described may be rotated 90° to effect a stylus tracking system which applies uniform vertical pressure between the stylus and the groove, or four bimorphs may be arranged to provide both vertical and lateral translation.

What is claimed is:

1. In a video disc playback apparatus the combination comprising:

a housing having supporting walls and a compliant support member at one end thereof;

a stylus;

a pickup arm supporting the stylus at one end thereof and having a second end;

a first bimorph longitudinally aligned with said pickup arm and having a first end fixedly attached to the second end of the pickup arm, first and second terminals, and, having second end, said first bimorph and pickup arm being arranged so that said first bimorph generates a signal at said first and second terminals responsive to lateral bending moments generated in said first bimorph;

a second bimorph having first and second ends and first and second terminals;

means fixedly attaching the first end of the second bimorph to the compliant support member to support lateral translation of the second end of said second bimorph in response to signals applied to its first and second terminals;

means fixedly attaching the second end of the first bimorph to the second end of the second bimorph, and connecting said pickup arm, first bimorph and second bimorph in longitudinal alignment and in tandem so that said first bimorph can impart lateral translational movement to the stylus;

circuit means responsive to signal potential at the terminals of the first bimorph for generating a control signal;

means for applying said control signal to the first and second terminals of the second bimorph.

2. The combination as set forth in claim 1 wherein the compliant support member permits relatively free movement of the pickup arm in the vertical direction but is relatively resistant to lateral movement of said pickup arm.

* * * * *